United States Patent [19]

Shikama

[11] Patent Number: 4,753,513
[45] Date of Patent: Jun. 28, 1988

[54] OPTICAL TYPE HEAD DEVICE

[75] Inventor: Shinsuke Shikama, Nagaokakyo, Japan

[73] Assignee: Mitsubishi Denki Kabushiki Kaisha, Tokyo, Japan

[21] Appl. No.: 39,230

[22] Filed: Apr. 17, 1987

[30] Foreign Application Priority Data

| Apr. 18, 1986 | [JP] | Japan | 61-89601 |
| Jun. 6, 1986 | [JP] | Japan | 61-131238 |
| Jun. 6, 1986 | [JP] | Japan | 61-131237 |
| Aug. 5, 1986 | [JP] | Japan | 61-183660 |
| Aug. 5, 1986 | [JP] | Japan | 61-183664 |

[51] Int. Cl.$^4$ .......... G11B 7/00; G02B 5/18
[52] U.S. Cl. .......... 350/162.11; 369/44; 369/46; 369/109
[58] Field of Search ........ 350/162.11, 162.15, 350/3.6, 3.72; 365/216; 369/44, 45, 46, 103, 109, 111, 112

[56] References Cited

U.S. PATENT DOCUMENTS

| 3,876,842 | 4/1975 | Bouwhuis | 369/46 |
| 3,919,465 | 11/1975 | Adler et al. | 369/109 |
| 4,171,879 | 10/1979 | Bricot et al. | 350/162.11 |
| 4,223,348 | 9/1980 | Oinoue et al. | 369/103 |
| 4,358,200 | 11/1982 | Heemskerk et al. | 356/123 |
| 4,581,728 | 4/1986 | Nakamura et al. | 369/46 |
| 4,607,356 | 8/1986 | Bricot et al. | 369/111 |
| 4,658,391 | 4/1987 | Nozu et al. | 369/46 |
| 4,661,944 | 4/1987 | Van Sluys | 369/46 |
| 4,667,316 | 5/1987 | Suda et al. | 369/45 |

FOREIGN PATENT DOCUMENTS

| 61-73246 | 4/1986 | Japan . |
| 61-122944 | 6/1986 | Japan . |
| 61-122945 | 6/1986 | Japan . |
| 61-151844 | 7/1986 | Japan . |

Primary Examiner—Bruce Y. Arnold
Assistant Examiner—Martin Lerner
Attorney, Agent, or Firm—Oblon, Fisher, Spivak, McClelland & Maier

[57] ABSTRACT

An optical type head device comprises an optical beam separating means having a first surface which functions to reflect a principal light beam emitted from a light source and to separate it into a zero-order subbeam and positive and negative first-order subbeams.

19 Claims, 9 Drawing Sheets

M = LIGHT SOURCE OF ZERO-ORDER SUBBEAM
S = LIGHT SOURCE OF FIRST-ORDER SUBBEAM

ZERO-ORDER SUBBEAM ------- F  M  E
POSITIVE FIRST-ORDER SUBBEAM -- F1  M1  E1
NEGATIVE FIRST-ORDER SUBBEAM ---- F-1  M-1  E-1

(a) POSITIVE FIRST-ORDER SUBBEAM (b) NEGATIVE FIRST-ORDER SUBBEAM

OPTICAL TYPE HEAD DEVICE

The present invention relates to an optical type head device used for recording and reproducing data on an optical type data storing medium. More particularly, it relates to an optical system for an optical type head device employing a three-beam system wherein a plurality of light spots are converged on an optical disc to function as a tracking sensor.

FIG. 6 is a diagram showing a conventional optical type head device. In FIG. 6, a reference numeral 1 designates a semiconductor laser (hereinbelow, referred to as an LD) as a light source, a numeral 3 designates a diffraction grating for separating by diffraction a light beam emitted from the LD1 into three subbeams, a numeral 4 designates a flat-shaped beam splitter to reflect the three subbeams to pass them as the incident lights in a condensor lens 5, a numeral 6 designates an optical type data storing medium, (hereinbelow, referred to as an optical disc) placed near the focal points of the subbeams transmitted through the lens 5, a numeral 7 designates pits as data recorded in the optical disc 6, a numeral 8 designates data tracks consisting of plural lines of the pits 7, and a numeral 10 designates a light detector which receives for photoelectric conversion the light beams which are reflected by the optical disc 6 and are transmitted through the lens 5 and the beam splitter 4.

The operation of the conventional device will be described. The principal light beams emitted from the LD1 is diffracted by the diffraction grating 3 to become three subbeams. The subbeams are reflected on a first surface of the beam splitter 4 and are respectively converged as three light spots 9a, 9e, 9f as shown by hatched lines on the data storing surface of the optical disc 6 by the lens 5 (FIG. 7).

The conventional optical device is so constructed that the three light spots 9a, 9e, 9f are arranged so that the line connecting each center of the light spots is slightly inclined to the longitudinal direction of the track 8. Thus, the light beams converged on the data storing surface of the optical disc 6 are reflected and are passed through the lens 5 and the beam splitter 4, where astigmatism is given to light beams. The three light beams are finally received as incident lights by the light detector 10 which is placed in such direction of optical axis that the reflected main beam, i.e. the zero-order subbeam forms a circle of least confusion when the light spot of the zero-order subbeam is focused on the optical disc 6. The light detector 10 has a construction in which a light sensing area is divided into six sections as shown in FIG. 8. Namely, the central area for receiving the main light beam (the zero-order subbeam) is divided into four sections 10a, 10b, 10c, 10d. There are two independent light sensing areas 10e, 10f at both sides of the central area so as to receive and sense side beams, i.e. the positive and negative first-order subbeams.

As well known, deviation of position of the central light spot 9a from the track 8 can be detected by calculating the differential output between the light sensing areas 10e, 10f by a subtracter 13, and a tracking error signal indicative of the positional deviation is generated from a terminal 14. The tracking error signal is to correct the light spot 9a at a proper position in the track 8 by driving a tracking actuator (not shown).

Outputs from the four sections in the light detector 10 are subjected to differential calculation for two pairs of diagonal components 10a, 10c and 10b, 10d, and a calculated output is taken at an output terminal 15 through a subtracter 12. The output from the terminal 15 is used as a focus error signal for correcting the deviation of focal point on the disc by a focus actuator (not shown).

The method of detecting the deviation of the focal point is referred to as an astimatic method wherein an electric signal is generated depending on the deformation of a light spot on the light detector, which is normally in a substantially round circle of least confusion when the light spot on the disc is in a focusing state. Such deformation is in a longitudinal or lateral oval shape as shown by broken lines.

The outputs from the sensing areas 10b, 10c are inputted in an adder 16 in which the outputs are summed and a resulted output is used as a signal for reproduction of the optical disc 6.

In the conventional optical type head device, it is necessary to provide independently a single diffraction grating to produce a plurality of light beams on the optical disc, hence, it pushes up manufacturing cost. Further, the distance between the LD and the beam splitter becomes large because the diffraction grating is put between them. The structure of the conventional device hinders miniaturization of the device.

It is an object of the present invention to provide an optical type head device for forming a plurality of light beams on an optical disc without using a diffraction grating as an independent optical element.

The foregoing and the other objects of the present invention have been attained by providing an optical type head device comprising a light source for emitting a principal light beam, a beam splitter for separating by diffraction the principal light beam into a plurality of diffracted subbeams including a zero-order subbeam and other subbeams, a condensor lens means for converging the subbeams reflected by the beam splitter on an optical type data storing medium as a plurality of light spots, a light detector for receiving for photoelectric conversion the subbeams which are reflected by a data storing surface of the optical type data storing medium and are again passed through the condensor lens means and first and second surfaces of the beam splitter, wherein an unfocused beam spot on the data storing medium is detected by sensing the deformation of the zero-order subbeam on the light detector, while data stored on the optical type data storing medium are reproduced by the zero-order subbeam, and deviation of a converged beam spot of the zero-order subbeam from a data track on the optical type data storing medium is detected by the other subbeams, characterized in that an optical beam separating means in which a diffraction grating is formed on the first surface of the splitter to separate the principal light beam emitted from the light source into a plurality of diffraction beams including the zero-order subbeam and the other subbeams is provided.

The flat-shaped optical beam separating means used for the present invention has a first surface which functions to perform the transmission and reflection of a light beam as well as the function of a diffraction grating, and a second surface for transmitting the light beams, by which astigmatism is given to the light beams reflected by the optical disc. Therefore, the device according to the present invention makes unnecessary the diffraction grating as an independent optical element.

In the drawings.

In the following, a first embodiment of the optical type head device of the present invention will be described with reference to FIG. 1 wherein the same reference numerals as in FIG. 6 designate the same or corresponding parts.

Figure 1:
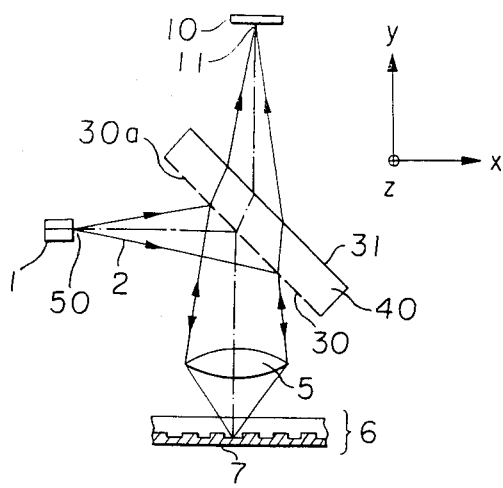
FIG. 1 is a diagram showing an embodiment of the optical system used for the optical type head device according to the present invention.

A reference numeral 40 designates a flat-shaped optical beam separating device which has a first surface 30 for reflecting the principal light beam 2 emitted from the emission point 50 of the LD1. A diffraction grating is formed on the first surface 30. In the embodiment shown in FIG. 1, a reflecting layer having the same reflecting factor as the reflecting surface of the conventional beam splitter is formed on the first surface 30. However, the reflecting layer may be omitted when the reflecting factor is not so severly required. A second surface 31 of the optical beam separating device constitutes a light transmission surface. An AR coating may be provided if necessary.

The function of the first embodiment will be described. The principal light beam 2 emitted from the LD1 is reflected on the first surface 30 of the light beam separating device 40 on which the diffraction grating is formed. The principal light beam 2 is divided into the zero-order subbeam, a positive (+) first-order subbeam and a negative (−) first-order subbeam. These diffracted subbeams are respectively converged on an optical disc 6 as three light spots by a condensor lens 5. The subbeams reflected by the optical disc are again transmitted through the lens 5 and the optical beam separating device 40 during which astigmatism is given to the subbeams, which enter in the light detector 10 as incident beams.

The function of the light detector 10 is the same as that used in the conventional device. Namely, a focus error signal is obtainable by the astigmatic method and the tracking error signal is obtainable by the differential calculation of the positive and negative first-order subbeams.

In the first embodiment of the present invention, the optical beam separating means having the first and second surfaces which are in parallel with each other. However, the optical beam separating means having a wedge-shaped first and second surfaces may be used to increase effect of the astigmatism.

Thus, the optical beam separating means of the present invention comprises the flat-shaped beam splitter which is provided with function of the diffraction grating. Accordingly, it is unnecessary to use a diffraction grating as an independent optical element between the light source and a beam splitter. With the construction of the embodiment, cost for manufacturing the optical type head device can be reduced and a small-sized device can be obtained by eliminating a separate optical element between the LD and the beam splitter.

In the next place, a second embodiment of the optical beam separating means of the present invention will be described. The construction of the second embodiment is substantially the same as that of the first embodiment shown in FIG. 1, and therefore, description of the same parts is omitted.

Explanation will be made as to how to design the locus of the diffraction grating of the second embodiment with reference to FIG. 9.

Figure 9:
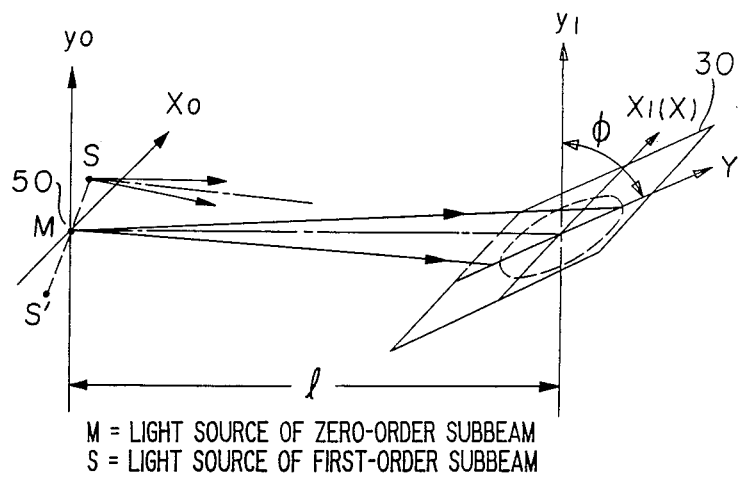
FIG. 9 is a diagram for explaining the locus of the diffraction grating.

In FIG. 9, a point M indicated by a reference numeral 50 is a light emitting point of the LD1. A symbol S represents a point in a plane which includes the light emitting point M of the LD1 and which perpendicularly intersects with an optical axis shown by one-dotted chain line, and the point S is in a conjugated relation to the positive and negative subbeams on the optical disc. The surface 30 having the diffraction grating is inclined at an angle of $\phi$ with respect to a plane perpendicular to the optical axis, the surface 30 including an $x_1$ axis at its center.

Assuming that each point light source is placed at the point M and the point S; optical waves having substantially the same wavelength as that of the principal light beam of the LD1 is emitted from each of the point light sources, and each of the phases of the optical waves on the grating surface 30 is expressed by $\phi_M(X, Y)$ and $\phi_S(X, Y)$, where X and Y represent co-ordinates on the grating surface as shown in FIG. 9, then, a phase difference $\Delta$ of the optical waves emitted from the points M and S on the plane including $x_0 - y_0$ which includes the light emitting point of the LD is expressed by the following equation (1):

$$\Delta = \phi_S(X, Y) - \phi_M(X, Y) \tag{1}$$

The boundary line of interference fringes caused by the optical waves emitted from the points M, S is given by the following equation (2):

$$\Delta = m\pi + \pi/2 \quad (m=0, \pm 1, \pm 2, \ldots) \tag{2}$$

When the diffraction grating having the grooves as determined by the equations (1), (2) is used, the first-order subbeam emitted from the light source 1 at the point M and reflected by the grating surface 30 becomes equivalent to the light beam which is emitted from the point light source at the point S and is reflected by a mirror on the surface 30. The negative first-order subbeam is equal to the light beam emitted from a point S'. The point S' and the point S is symmetrical with respect to the point M.

Figure 10:
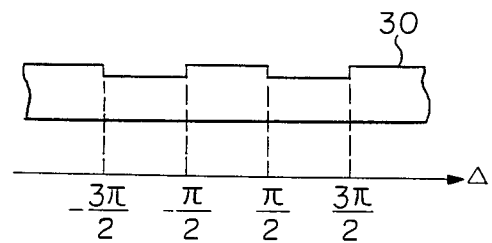
FIGS. 10 and 11 are respectively diagrams showing cross-section of the diffraction gratings.

FIG. 10 is a cross-sectional view of a phase type diffraction grating capable of realizing the above-mentioned function. In FIG. 10, the co-ordinate along the surface 30 is expressed by phase difference $\Delta$ for simplifying explanation. A desired phase type diffraction grating can be formed by defining rectangular recesses on the surface 30 in which each of the phase difference $\Delta$ which is determined by substituting a figure for m in the equation 2 constitutes each boundary line.

Figure 11:
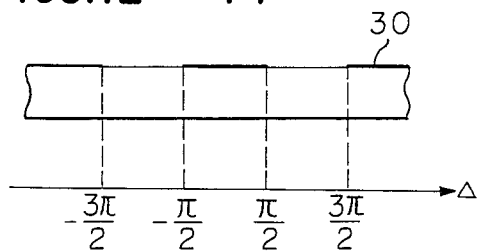

FIG. 11 is a cross-sectional view of an amplitude type diffraction grating capable of realizing the above-mentioned function. In the amplitude type diffraction grating, a portion having a higher reflecting factor (indicated by a thick line) and a portion having a low reflecting factor (indicated by a thin line) are alternately formed on the surface 30 in which each of the phase difference $\Delta$ which is determining by substituting a figure for m in the equation (2) constitutes each boundary line.

Figure 12:
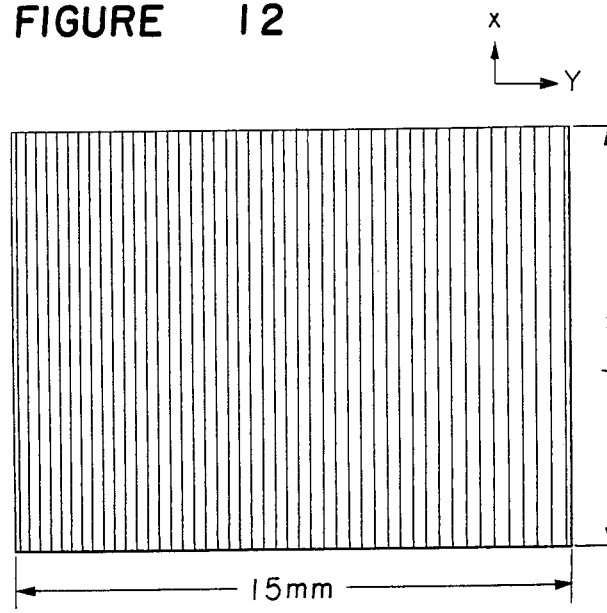
FIGS. 12 and 13 are respectively diagrams showing the locus of the gratings.

FIG. 12 is a diagram showing an example of calculation of the locus of the diffraction grating, wherein the following values are used as parameters as shown in FIG. 9, where the position of the point S in the $x_0$-$y_0$ co-ordinate system is given by ($x_s$, $y_s$):

$x_s=0$, $y_s=100$ μm, $l=6$ mm and $\phi=45°$

The dimension of an optical beam separating substrate is 1.5 mm×1 mm as shown in FIG. 12. In this case, the three light beams are located in the meridional plane with respect to the grating surface obliquely placed; the locus of the each of the gratings is substantially linear, and the width of the locus of the grating is gradually changed in the Y direction.

Figure 14:
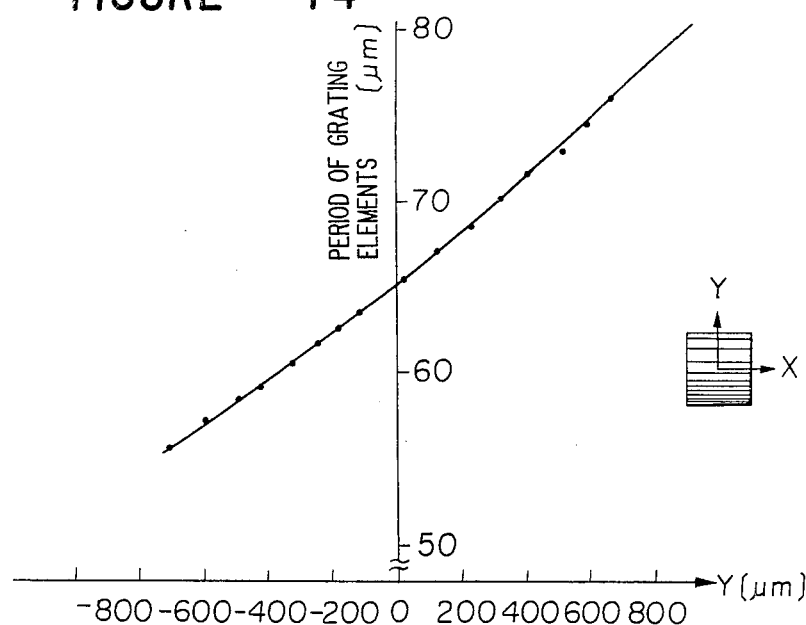
FIG. 14 is a diagram showing change in the period in Y direction of the diffraction grating in FIG. 12.

FIG. 14 is a diagram showing variation of the period of the diffraction grating in the Y direction. It is understandable from FIG. 14 that the period of the grating in the Y direction changes linearly. Accordingly, in the practical viewpoint, the period of the diffraction grating having linear locus may be linearly changed.

Figure 13:
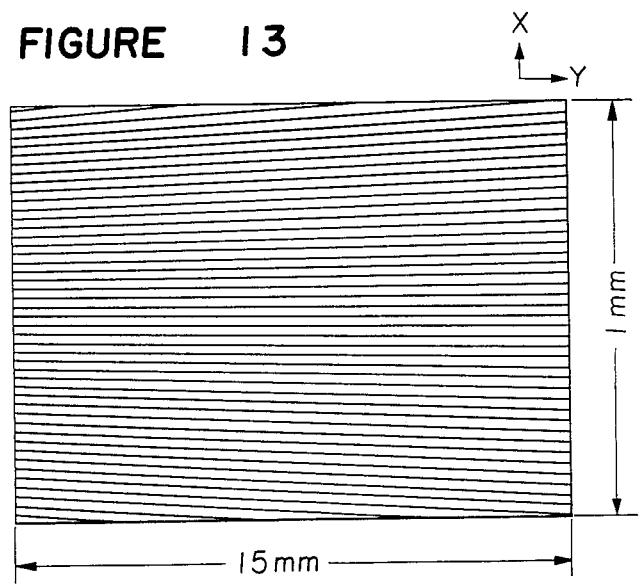

FIG. 13 shows the locus of the diffraction grating obtained by calculation of the following parameters in the case that the three light beams are in the sagittal plane:

$x_s=100$ μm, $y_s=0$, $l=6$ mm, $\phi=45°$

It is understandable from FIG. 13 that the locus of the diffraction grating is in fan-shaped in the Y direction.

In this embodiment, although the locus of the interference fringes is obtained from the equations (1) and (2), the diffraction grating may be prepared by arranging each of the point light sources at the points M, S as shown in FIG. 9, followed by conducting holographic exposure ("Holographic Grating" by Mr. Sano and Mr. Koike, ELECTRONICS, 1985, volume 11, p. 98). Further, the flat-shaped optical beam separating device may be wedge-shaped to control the astigmatism of the reflected light beams.

In the above-mentioned embodiment, description has been made as to the locus of the diffraction grating in the case that the three light beams are arranged in the meridional plane ($x_s=0$) and the sagittal plane ($y_s=0$). However, the arrangement of the three light beams may be in other than those planes. Namely, the locus of the diffraction grating can be determined from the equations (1), (2) even though the point s is determined at any position in the ($x_0$-$y_0$) plane. Particularly, the three light beams on the optical disc are respectively converged on a plane which is turned by 45° with respect to the meridional plane of the optical beam separating device 30. This situation is equivalent to the case that the axial direction of a conventional cylindrical lens which is used for the astigmatism method is directed to at an angle of 45° to the track. This arrangement is advantageous from the viewpoint of the characteristics of a focus sensor, the arrangement being described in Japanese Examined Patent Publication No. 37722/1978. The locus of the diffraction grating having the three light beams at an angle of 45° is obtainable by positioning the point S to have a relation of $x_s=y_s$ in FIG. 9.

Generally, when the locus of the diffraction grating having a construction other than the above-mentioned second embodiment (namely, the two point light sources on the plane including the original light source form the interference fringes) is used, there takes place aberration of the positive and negative first-order subbeams occuring by the diffraction grating. If such aberration occurs, the shape of the light spots $9b$, $9f$ on the optical disc causes distortion, whereby it is difficult to obtain a good tracking error signal. However, when the shape of the locus of the grating follows the interference fringes as by the present invention, the positive and negative first-order subbeams are basically produced without aberration, whereby the spots $9e$, $9f$ provide a shape having desired diffraction limit. The embodiment of the present invention produces a good tracking error signal compatible with the conventional three light beam optical type head device.

Thus, in accordance with the second embodiment of the present invention, the locus of the diffraction grating follows the interference fringes of the two point light sources arranged in substantially the same plane as the original light source. Accordingly, there is no aberration of the first-order subbeams separated by diffraction to thereby produce a desired output as a tracking sensor, in addition to the same function as in the first embodiment.

A third embodiment of the optical type head device of the present invention will be described.

Figure 8:
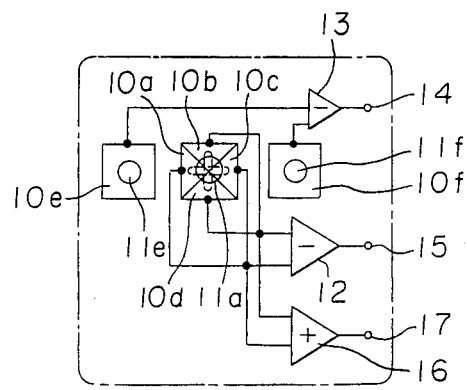
FIG. 8 is a circuit diagram of a light detector used for a typical optical type head.

In accordance with the third embodiment of the present invention, a signal for reproducing information on the optical disc can be preferably detected by reducing the intensity of transmitting light beams reflected by the optical disc, which transmitting light beams are mixed with the original reflecting light beams which has to be properly incident into the light detector. Namely, when the three reflecting light beams reflected on the optical disc 6 are passed through a diffraction grating 30a formed on a flat-shaped beam separating device 40, the beams are subjected to diffraction to thereby form nine light spots on the light detector 10. As a result, there takes place superposition of the light beams on the light detector (especially on the areas divided into four sections as shown in FIG. 8) which has to properly receive a reflecting light beam corresponding to the zero-order subbeam for reproducing the data on the optical disc.

The third embodiment of the present invention is to solve the problem that there may be caused deterioration in quality of a reproduced signal by such superposition of the light beams.

The problem of the superposition of the light beams will be described with reference to FIG. 15.

The principal light beam 2 emitted from the LD1 is separated by the diffraction grating 30 into the zero-order subbeam m and the positive and negative first-order subbeams e, f. The three diffraction light beams are reflected on the optical disc 6 and again enter into the optical beam separating device 4 in which they are subjected to diffraction by the first surface 30 including the diffraction grating and the second surface 31, whereby each of the three subbeams is separated into a transmitting zero-order subbeam and transmitting positive and negative first-order subbeams. Accordingly, as shown in FIG. 15, three transmitting diffraction beams M1, M, M-1 are produced from the reflecting zero-order subbeam m; three transmitting diffraction beams F1, F, F-1 are produced from the reflecting positive first-order subbeam f, and three transmitting diffraction beams E1, E, E-1 are produced from the reflecting negative first-order subbeam e. Then, four sensing areas 10a, 10b, 10c, 10d of the light detector 10 receive undesired transmitting diffraction beams E1, F-1 in addition to the desired reproducing signal M as shown in FIG. 8. Accordingly, the transmitting positive first-order subbeam E1 of the reflecting negative first-order subbeam and the transmitting negative first-order subbeam F-1 of the reflecting positive first-order subbeam constitute noise components to the information to be reproduced by the original light beam (i.e. the reflecting zero-order subbeam m). The noise signals reduces the quality of the signal to be taken out as an input to the adder 16.

The above-mentioned problem can be solved by the third embodiment of the present invention.

The construction of the third embodiment of the optical type head device is generally the same as that shown in FIG. 1. A part of the phase type diffraction grating 30a which is formed on a surface of the flat-shaped optical beam separating device 40 is shown in FIG. 2 in an enlarged view.

Figure 2:
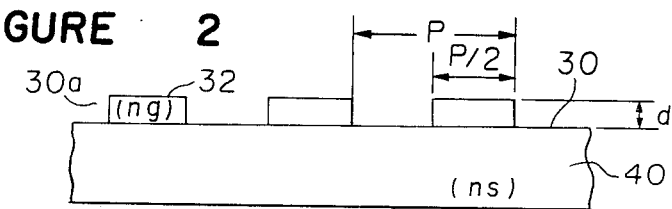
FIG. 2 is an enlarged cross-sectional view of an embodiment of the phase type diffraction grating used for the present invention.

As shown in FIG. 2, the phase type diffraction grating 30a is formed on a surface of the optical beam separating device substrate 40 having a refractive index $n_s$ as a row of diffraction grating elements 32 of a rectangular shape in cross-section having a refractive index $n_g$. For simplification, it is assumed that the period p of the grating elements 32 is constant; the duty ratio of the rectangular grating elements 32 is 0.5 and the thickness of the grating elements is d. By properly determining the values of the above-mentioned parameters $n_g$ and d and the wavelength $\lambda$ of the light source, a predetermined phase difference can be given to the diffracted light beams (the detail will be described later). In the third embodiment of the present invention, by using the phase type diffraction grating 30a having rectangular grating elements 32 on the optical beam separating device substrate, a predetermined function can be obtained.

The flat-shaped optical beam separating device 40 is arranged at an angle of 45° with respect to a light beam reflected by the optical disc 6.

Now, description will be made as to a relation of the quantity of phase to the intensity of diffracted light beam when the reflecting light enters in the phase type diffraction grating 30a at an angle of incidence of $\theta$.

Figure 3A:
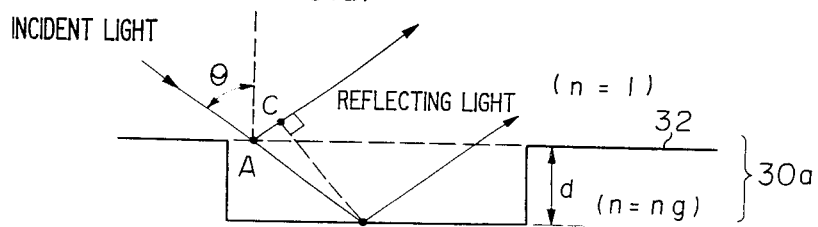
FIGS. 3a and 3b are respectively diagrams showing change in phase of a light beam when it obliquely enters in the phase type diffraction grating.
Figure 3B:
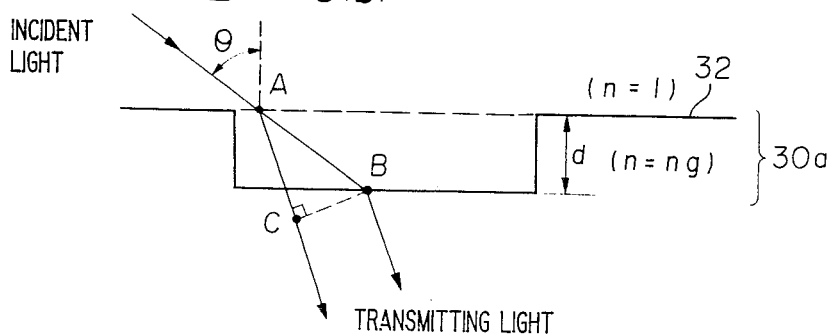

FIG. 3a is a diagram to obtain the quantity of phase when a light beam is reflected, and FIG. 3b is a diagram to obtain the quantity of phase when a light beam is transmitted.

Assuming that the diffraction grating 30a is placed in space, the quantity of phase $\phi r$ which is conversion of the difference in length of two light paths ([AB]−[AC]) into phase difference is obtained by the following equation:

$$\phi r = 4\pi d \cos(\theta)/\lambda \tag{1}$$

where the wavelength of the light source in air is $\lambda$.

In the case of transmission of the light beam, the quantity of phase $\phi \tau$ is obtainable by the following equation in consideration of difference in length of the paths ([AB]−[AC]) in which the refractive index $n_s$ of the optical beam separating device substrate is considered to have the same the refractive index $n_g$ of the grating material:

$$\phi \tau = 2\pi d \{\cos(\theta) - \sqrt{n_g^2 - \sin^2(\theta)}\}/\lambda \tag{2}$$

On the other hand, when the duty ratio of the rectangular grating element 32 of the phase type diffraction grating is 0.5, the thickness of the groove is sufficiently smaller than the width of the groove, and influence of the edges of the rectangular grating element 32 is negligible, the ratio of the intensity of the first-order beam $I_1$ to the intensity of the zero-order beam $I_0$ with respect to the quantity of phase $\phi$ is expressed by the following equation:

$$I_1/I_0 = \left(\frac{2}{\pi} \cdot \tan(\phi/2)\right)^2 \tag{3}$$

In the equation (3), when an ideal rectangular shape is provided, the positive and negative first-order beams have the same value.

When the intensity of each of the transmitting diffraction beams M, E1, F-1 as incident beams to the light detector 10 shown in FIG. 8 is represented by $I_M$, $I_{E1}$, $I_{F-1}$ respectively, a ratio of intensity of an interference light to the intensity of a signal light on the light detector 10 is obtained by the following equation (4) by repeatedly substituting the equations (1), (2) into the equation (3):

$$I_{E1}/I_M = I_{F-1}/I_M = \left(\frac{2}{\pi}\right)^4 \tan^2(\phi r/2) \cdot \tan^2(\phi \tau/2) \tag{4}$$

Accordingly, in order to reduce the intensity of the interference light, the values of the parameters d, $\theta$, $\lambda$, and $n_g$ in the equations (1), (2) are respectively so determined that the above-mentioned equation (4) satisfies a predetermined value such as 0.01 or lower.

Figure 4:
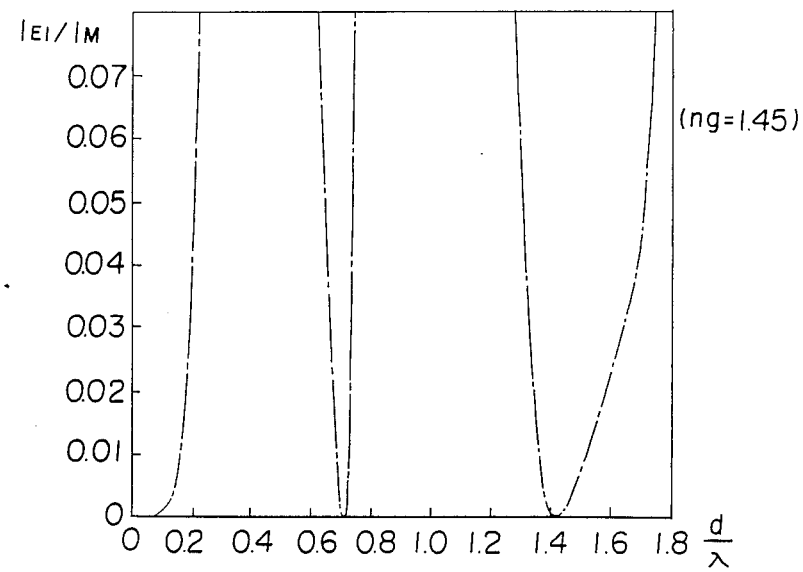
FIG. 4 is a graph showing a relation of a light intensity ratio to the thickness of a rectangular grating when there takes place interference by an incident light beam at an angle of 45° in the diffraction grating made of $SiO_2$.

FIG. 4 is a diagram showing the characteristics of the light beam separating device 40 in which the rectangular grating elements 32 made of $SiO_2$ are used. The data are obtained by plotting the above-mentioned equation (4) for the value (d/λ) in which $n_g = 1.45$ ($SiO_2$) and $\theta = \pi/4$ are used as the parameters. The grating is prepared by sputtering the silicon dioxide. It is evident from FIG. 4 that there are relations of $0 < d/\lambda < 0.16$ and $1.36 < d/\lambda < 1.52$ to obtain the optimum ratio of intensity, i.e. as a region of $I_{E1}/I_M < 0.01$. It is also understandable that when the wavelength of the LD1 is 0.78 μm, the thickness d of the grating corresponding to the above-mentioned range is $0 < d < 0.12$ and $1.06 < d < 1.19$ (μm).

Figure 5:
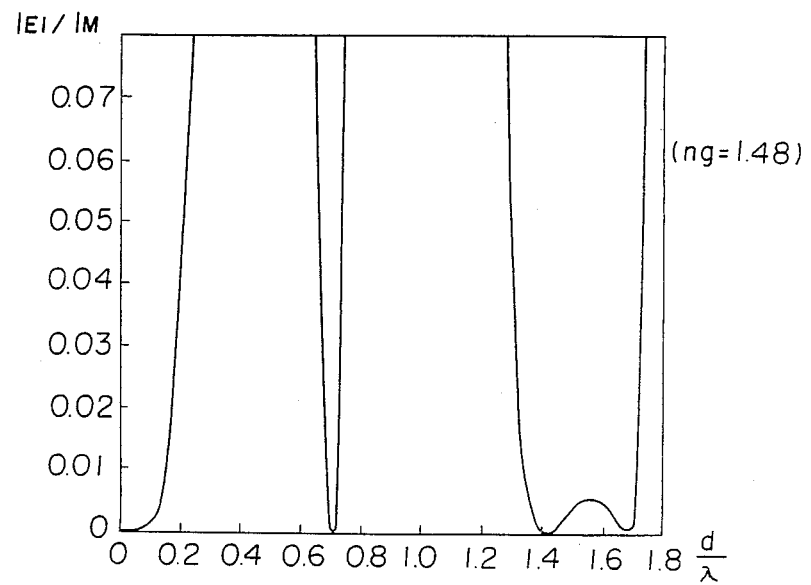
FIG. 5 is a graph showing a relation of an intensity ratio to the thickness of the rectangular grating when there takes place interference by a light beam incident at an angle of 45° in the diffraction grating made of polymethyl methacrylate.
Figure 6:
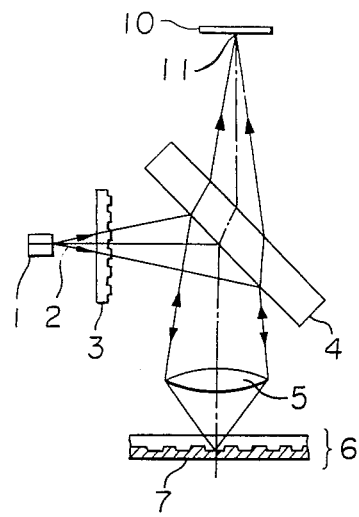
FIG. 6 is a diagram showing a conventional optical type head device.
Figure 7:
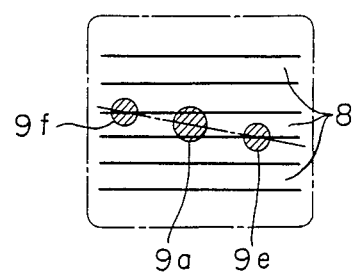
FIG. 7 is a diagram showing light spots on an optical disc.

FIG. 5 is a diagram showing the characteristics of the light beam separating device 40 in which the rectangular grating element 32 is made of polymethyl methacrylate (PMMA). The data are obtained by plotting the above-mentioned equation (4) for the value (d/λ) in which $n_g = 1.48$ (PMMA) and $\theta = \pi/4$ are used as the parameters. The grating is made by injection molding of PMMA.

It is readable from FIG. 5 that there are relations of $0 < d/\lambda < 0.16$ and $1.34 < d/\lambda < 1.72$ in order to obtain the optimum ratio of intensity, i.e. as a region of $I_{E1}/I_M < 0.01$. And, the thickness of the grating corresponding to the above-mentioned range is preferably $0 < d < 0.12$ and $1.05 < d < 1.34$ (μm) when the wavelength of the LD is typically 0.78 μm.

Thus, by determining material for the phase type diffraction grating 30a and an angle of inclination of the optical beam separating means, the thickness of the rectangular grating element 32 is determined. The flat-shaped optical beam separating device 40 prepared by using the values remarkably reduces the intensity of the transmitting positive and negative first-order beams of a reflecting light beam from the optical disc, and therefore, it does not influence a detecting signal required by the light detector 10.

Figure 15:
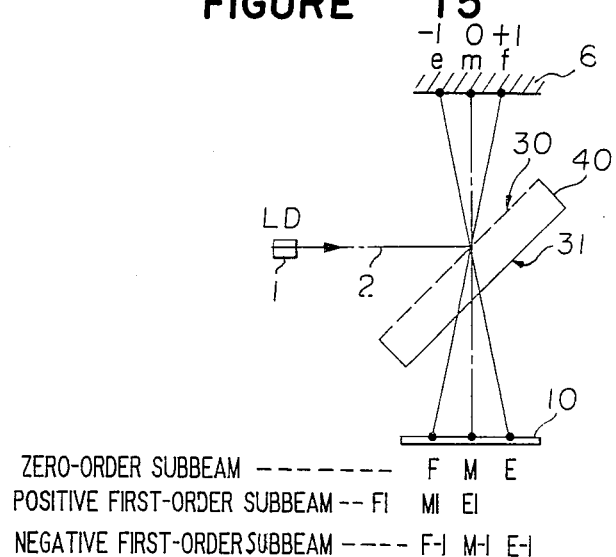
FIG. 15 is a diagram showing a problem to be solved by the present invention.

The transmitting positive and negative first-order beams M1, M-1 influence the reflecting positive and negative first-order beams which are used to detect tracking errors as shown in FIG. 15. However, the transmitting positive and negative first-order beams M1, M-1 can be effectively removed by electrically cancelling a signal detected by the sensing areas 10e, 10f. Accordingly, it does not raise any problems.

As described above, description has been made as to how the optimum parameters are determined for the grating employing the materials as above-mentioned in which an incident beam enters in the grating at an angle of 45°. In any case, an optical type head device having excellent characteristics of reproduction can be obtained by determining the ratio of intensity of the interference light to the signal light to be 0.01 or lower by the application of the equations (1), (2) and (4).

Further, when a higher quality of signal for reproduction of the information is required, the above-mentioned equation (4) is used by reducing the value of the intensity ratio. Namely, this embodiment present invention satisfies requirements in any phase type diffraction grating.

In the above-mentioned description, the phase type diffraction grating in which the distance of the locus of the grating elements is equal and the duty ratio is 0.5, and which gives phase shifting in the rectangular shape is taken to introduce the equations (1)-(4). However, the equations (1)-(4) are also applicable to the diffraction grating having the locus of interference fringes when it has the equal distance of grating elements and has a rectangular phase shifting function of the duty ratio 0.5 in view of a limited period range.

For the phase type diffraction grating 30a having a rectangular shape in cross-section, it is possible to use another material for the phase type diffraction grating. Namely, deformation of the shape of the surface of a thermoplastic material may be utilized. Or, a refractive index may be changed by irradiating light to an amorphous semiconductor device including a chalcogenide series compound.

In the former case, a thermoplastic resin layer is coated on a photoconductive material followed by subjecting it to a corona discharge, electric-charging and heating, whereby projections and recesses are formed on the surface area of the thermoplastic coating to provide a phase type diffraction grating.

In the latter case, an amorphous semiconductor thin layer is formed on the glass substrate by a vacuum vapor deposition or a high frequency sputtering method, followed by irradiating a light having a specific wavelength on the thin film to cause microscopic change of structure, whereby change of the refractive index is given to the thin film.

Thus, the phase type diffraction grating employing the above-mentioned techniques can be used in the present invention. By determining suitably the quantity of phase of the diffraction grating, the intensity of the interference light can be reduced so that interference to a necessary signal is minimized to the extent of a permissible value or lower.

In accordance with the third embodiment of the present invention, a proportion of mixing the interference light into the reflecting light to be received in the light detector can be reduced to a predetermined value or lower. Accordingly, the optical type head device having excellent characteristics of reproduction can be obtained. Further, since the locus of the diffraction grating elements forms the interference fringes by two point light sources placed in the same plane as the original light source, there takes place no aberration on the first-order beam separated by diffraction, and a desired tracking-sensor output can be obtained.

A fourth embodiment of the optical type head device according to the present invention will be described. The construction of the fourth embodiment is substantially the same as that of the first embodiment shown in FIG. 1, and only different parts will be described.

The diffraction grating 30a of the optical beam separating device 40 is constituted by linear fringes extending in the z direction in the first surface 30 in which the locus of the grating elements has a constant period p to form a diffraction grating having equal pitch. The optical beam separating device 40 is placed at an angle of 45° with respect to the light beam emitted from the LD1. When the principal light beam from the LD1 obliquely enters into the first surface 30 of the optical beam separating device 40, the zero-order subbeam and positive and negative first-order subbeams are produced by diffraction and the subbeams are respectively converged on the pits in the optical disc 6. In this case, an x-y plane in FIG. 1 corresponds to the meridional plane of the optical beam separating device 40.

Figure 19:
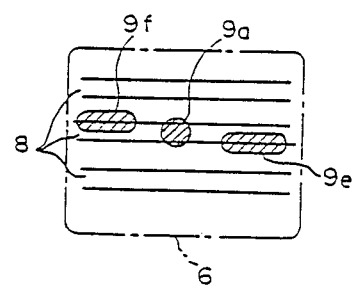
FIG. 19 is a diagram showing distribution of light spots on an optical disc.

When an emitting beam (or a converging beam) enters in the diffraction grating 30a having the equal pitch, there takes place astigmatism of the positive and negative first-order subbeams in which the position of the light spot of the zero-order subbeam corresponds to the sagittal focal line of the positive and negative first-order subbeams. Accordingly, the spots 9e, 9f of the positive and negative first-order subbeams on the optical disc form a sagittal focal line spot extending in the direction of the track 8 as shown in FIG. 19. As the three subbeam spots are so determined that they are arranged at a small angle of inclination with respect to the track 8. This is effected by shifting the locus of fringes of the diffraction grating 30a extending in the z direction by a small angle, or an optical system consisting of the LD1, the optical beam separating device 40 and the condenser lens 5 is turned around the y axis by a small angle. Thus, it is possible to determine the spot 9a of the zero-order subbeam at a proper position in the track and to determine each of the spots 9e, 9f of the positive and negative first-order subbeams at positions shifting by one-half of the distance of the track 8 on the both sides of the track 8.

The function of the diffraction grating 30a formed on the first surface 30 of the optical beam separating device 40 will be described with reference to FIGS. 16 and 17.

Figure 16:
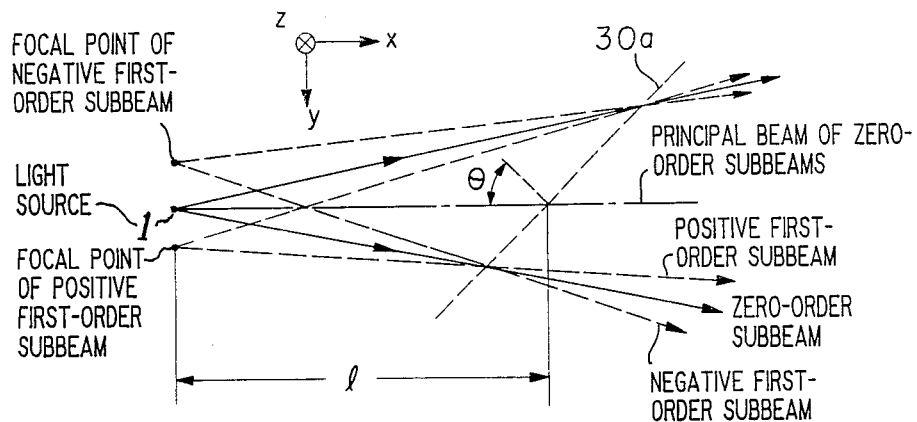
FIG. 16 is a diagram shown as a model to analyze the function of an oblique incident type diffraction grating.
Figure 17:
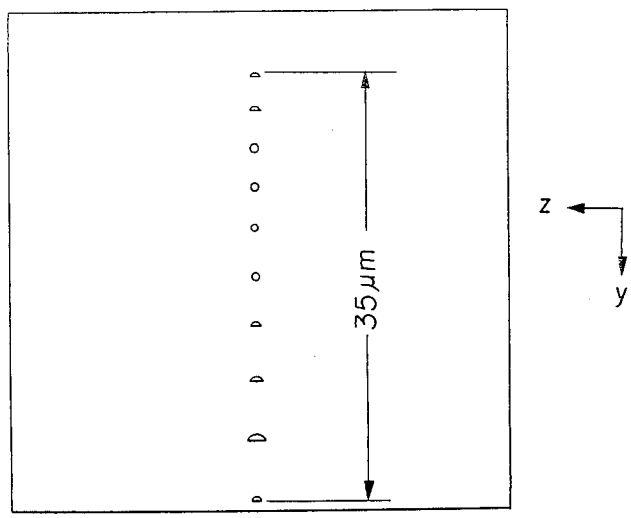
FIGS. 17a and 17b are respectively diagrams showing the spots of positive and negative first-order subbeams in a light source surface when the oblique incident type diffraction grating is used.
Figure 17:
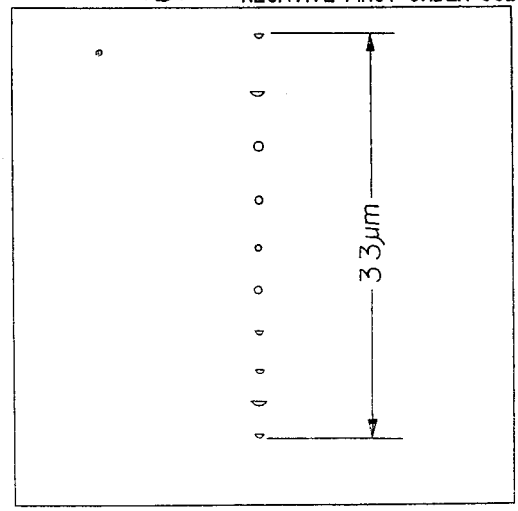

FIG. 17 is a diagram as a model to analyze the positive and negative first-order subbeams diffracted by an oblique incident type diffraction grating 30a by tracing the subbeams. In FIG. 17, a symbol l is the length of the principal light beam from the light emitting point of the LD1 to the diffraction grating 30a, a symbol p is the pitch between the diffraction grating elements, and a symbol $\theta$ is the angle of inclination of the grating (i.e. an angle of incidence). In FIG. 1, the direction of the fringes of the grating elements is normal to the surface of the paper. Broken lines in FIG. 16 indicate the positive and negative first-order subbeams. FIG. 16 shows the function of the diffraction grating in the case of diffraction of transmitting subbeams; however, the same result can be obtained in the case of diffraction of reflecting the subbeams.

It is understandable from FIG. 16 that light spots (in imaginary) of the positive and negative first-order subbeams are formed on the same plane as the light source by tracing the positive and negative first-order subbeams in the direction reverse to the propagation of the beams.

FIGS. 17a and 17b show diagrams of light spots of the positive and negative first-order subbeams on the plane including the light source which is obtained by tracing the subbeams by simulation, wherein as parameters for calculation, there are provided l=6 mm, p=66.2 μm, $\theta$=45° and the numerical aperture of the principal light beam emitted from the light source is 0.09.

FIG. 17 show that the positive first-order subbeam constitutes a sagittal focal line of about 35 μm and the negative first-order subbeam constitutes a sagittal focal line of about 33 μm. In this case, behavior of the beam in the z axis direction (the sagittal direction) is not influenced by the diffraction grating 30a, and therefore the focal lines of the positive and negative first-order subbeams constitute the sagittal focal line. As described above, since the positive and negative first-order subbeams imaginary observed on the surface including the light source give the sagittal focal line, the spots 9e, 9f of the first-order subbeams on the data-bearing surface of the optical disc which is conjugated with the light source form a sagittal focal line, hence the direction of the focal line is substantially corresponding to the direction of the track 8.

In the present invention, the length of the focal line is significant, and therefore description will be made as to determination of the length of the focal line by using specific values.

When the numerical aperture of a light beam transmitted to the optical disc 6 through the condenser lens 5 is 0.45 (which is typically used for a head device), the length of the focal line on the optical disc is $35 \times 0.09/0.45 \approx 7$ μm for the positive first-order subbeam and $33 \times 0.09/0.45 \approx 6.6$ μm for the negative first-order subbeam because the numerical aperture of the light beam on the light source side is 0.09. According to the standard for compact discs, for instance, the longest period L of data on the disc (i.e. the length given by the combination of the smallest pit and the longest land) is 6.6 μm. If the length of the light spot for reproduction of the data in the track direction is greater than the longest period L, a reproducing signal can not be basically obtained. Accordingly, there is no mixing of the reproducing signal into the positive and negative first-order subbeams in principle because the length of the focal line on the disc is 6.6 μm or greater. Of course, in the present invention, mixing of the reproducing signal into the positive and negative first-order subbeams can be reduced by forming the focal line spots without dependence on severe determination of the length of the focal line, and it is not always necessary that the length of the focal line is longer than the longest period L.

In the fourth embodiment, however, the length of the focal line is made greater than the longest period L of the recording signal on the disc in order to avoid the mixing of the noise components into the reproducing signal as possible. In the following, description as to how the length of the focal line is determined will be described.

Figure 18:
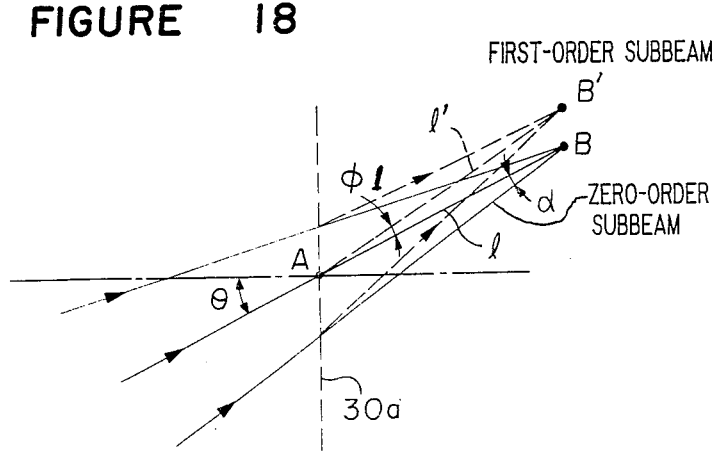
FIG. 18 is a diagram shown as a model for calculating an astimatic focal distance in the oblique incident type diffracting grating.

First of all, calculation of astigmatic focal distance occurring in the light beam on the light source side will be described with reference to FIG. 18. In FIG. 18, solid lines show a light beam having a conversion point B and an incident beam to the diffraction grating 30a with the half angle $\alpha$ of a convergence angle. Broken lines show the first-order subbeam. In FIG. 18, a point A designates an incidence point of the zero-order subbeam in which a symbol $\phi_1$ is an angle of diffraction and a symbol B' is a meridional focal point of the first-order subbeam. Then, the diffraction angle $\phi_1$ is expressed in the following equation (5):

$$\phi_1 \approx \frac{\lambda}{p\cos\theta} \quad (5)$$

where p is the pitch of the grating elements, $\theta$ is an angle of incidence and $\lambda$ is the wavelength of the subbeam.

When $\overline{AB}=l$, and $\overline{AB'}=l'$ in FIG. 18, then, the astigmatic focal distance $\Delta_1$ occuring in the positive and negative first-order subbeams is expressed by the following equation (because the distance between the point A and the sagittal focal point of the first-order subbeam is $\Delta_1$):

$$\Delta_1 = \lim_{\alpha \to 0}(l - l') \quad (6)$$

$$= l\left(1 - \frac{\cos(\theta \pm \phi_1)}{\cos\theta \pm \phi_1 \sin\theta}\right)$$

In the equation (6), a (+) mark represents the positive first-order subbeam and a (−) mark represents the negative first-order subbeam.

Since the numerical aperture Na1 of the light beam on the light source side is expressed as Na1=sin α, the length of the focal line $S_1$ on the plane including the light source is expressed as follows:

$$S_1 = 2 \times |\Delta_1| \times \tan(\sin^{-1}(Na1)) \tag{8}$$

On the other hand, in the optical system as shown in FIG. 1, when the numerical aperture Na1 of the beam on the light source side is converted into the numerical aperture Na2 by the condenser lens, the length of the focal line $S_2$ of the positive and negative first-order subbeams on the optical disc 6 is obtained in accordance with the equations (6) and (8) as follows:

$$S_2 = S_1 \frac{Na1}{Na2} = 2 l \left| 1 - \frac{\cos(\theta \pm \phi_1)}{\cos\theta \pm \phi_1 \sin\theta} \right| \cdot \tag{9}$$

$$\left( \frac{Na1}{Na2} \right) \cdot \tan\{\sin^{-1}(Na1)\}$$

Accordingly, the length of the focal line $S_2$ on the optical disc can be made longer than the longest period L of the recording signal by selecting the parameters λ, p, θ, l, Na1, Na2 to satisfy the following equation (10) in which the length of the focal line $S_2$ is calculated by the equations (5), (9):

$$S_2 \geq L \tag{10}$$

For instance, by calculating the above-mentioned equations by using the parameters obtained by the model as shown in FIG. 16, the diffraction angle $\phi_1 = 0.0167$ is provided by the equation (5) and $S_2 = 7.2$ μm for the positive first-order subbeam and $S_2 = 7.3$ μm for the negative first-order subbeam are respectively obtained from the equation (9). These values satisfy the equation (10) when the longest period L is 6.6 μm. Accordingly, mixture of the reproducing signal to the tracking error signal can be completely removed in principle.

Thus, a desired tracking error signal can be obtained by making the length of focal line of the positive and negative first-order subbeams longer than the longest period L. On the other hand, the reflecting beam reflected by the optical disc 6 is subjected to astigmatism when it is passed through the optical beam separating device 40 and is received as an incident beam by the light detector 10. Accordingly, the tracking error signal, the focusing error signal and the reproducing signal can be obtained by the reflecting beams of the zero-order subbeam and positive and negative first-order subbeams which are incident beams to the light detector 10, and the data in the optical disc 6 can be preferably read out by the tracking error signal and the focusing error signal under the condition that the head device is correctly positioned on the optical disc 6.

In the above-mentioned embodiment, the angle of incidence of the laser beam is 45° to the first surface 30 on which the diffraction grating is formed. However, the same effect can be obtained by forming the focal line of the first-order subbeam on the optical disc 6 according to the equation (9) at an angle other than 45°.

When the optical beam separating device 40 having a wedge-shaped substrate is used instead of the parallel-shaped substrate, the astigmatism can be also effected to the reflecting beam by the optical disc 6.

The present invention is applicable to another optical type data storing medium such as video discs. Further, the present invention is effectively applicable to a device having a data recording head or a data recording-/reproducing head.

Thus, in accordance with the fourth embodiment of the present invention, the optical beam separating device having the first surface on which the diffraction grating is formed is used, and the three beam spots produced by the diffraction grating are in or near the meridional plane of the first surface of the optical beam separating device. Accordingly, the beam spots of the positive and negative first-order subbeams on the optical disc can be converged as the focal line spot existing along the track direction. As a result, a mixture of the recorded data in the optical disc into the tracking error signal is reduced, and the spot of the first-order beam can be located at the position where the detecting output of the tracking signal is the greatest. And, by making the length of the focal line spot longer than the longest period of the recording signal, mixture of the data recorded in the optical disc into the tracking error signal can be avoided.

In the present invention, it is unnecessary to use the diffraction grating separate from the flat-shaped beam splitter. Accordingly, the number of structural elements for the optical system can be reduced, whereby the optical type head device can be manufactured at low cost.

I claim:

1. An optical type head device comprising:
   a light source for emitting a principal light beam,
   a beam splitter for separating by diffraction the principal light beam into a plurality of diffracted subbeams including a zero-order subbeam and other subbeams,
   a condensor lens means for converging the subbeams reflected by said beam splitter on an optical type data storing medium as a plurality of light spots, and
   a light detector for receiving for photoelectric conversion said subbeams which are reflected by a data storing surface of said optical type data storing medium and are again passed through said condensor lens means and first and second surfaces of said beam splitter, wherein an unfocused beam spot on said data storing medium is detected by sensing the deformation of the zero-order subbeam on said light detector, while data stored on said optical type data storing medium are reproduced by said zero-order subbeam, and deviation of a converged beam spot of the zero-order subbeam from a data track on said optical type data storing medium is detected by the other subbeams, characterized in that an optical beam separating means in which a diffraction grating is formed on the first surface of said splitter to separate the principal light beam emitted from said light source into a plurality of diffraction beams including the zero-order subbeam and the other subbeams is provided.

2. The optical type head device according to claim 1, wherein said diffraction grating is a phase type one for separating the principal light beam from said light source into three beams, i.e. the zero-order subbeam, a positive (+) first-order subbeam and a negative (−) first-order subbeam.

3. The optical type head device according to claim 1, wherein said diffraction grating is an amplitude type one for separating the principal light beam emitted from said light source into three beams, i.e. the zero-order subbeam, a positive (+) first-order subbeam, and a negative (−) first-order subbeams.

4. The optical type head device according to claim 1, wherein said diffraction grating is a phase type diffraction grating constituted by linear fringes having a uniform period, which is arranged in such a manner that the light spots of the subbeams separated by said diffraction grating are irradiated at predetermined positions on said data storing medium, and wherein the phase of said phase type diffraction grating is so adjusted that, when the subbeams reflected by said data storing medium are passed through said optical beam separating means for further diffraction, a ratio of intensity of the transmitting negative first-order subbeam of a reflecting positive first-order subbeam to the transmitting zero-order subbeam of a reflecting zero-order subbeam ($I_{F-1}/I_M$), and a ratio of intensity of the transmitting positive first-order subbeam of a reflecting negative first-order subbeam to the transmitting zero-order subbeam of the reflecting zero-order subbeam ($I_{EI}/I_M$) are respectively so determined as to be a predetermined value or lower, which value does not cause error of detection.

5. The optical type head device according to claim 4, wherein said optical beam separating means is so arranged that the light spots, on said data storing medium, of the separated subbeams are near the meridional plane of the first surface of said optical beam separating means, and wherein, when the zero-order subbeam is focused at a given position on said data storing medium, said positive and negative subbeams are focused as focal line spots on said data storing medium at positions along the longitudinal direction of said track.

6. The optical type head device according to claim 5, wherein the length of focal line $S_2$, which is formed by the positive and negative subbeams on the data storing medium, is determined to be greater than the longest period of signals recorded in said medium as expressed below:

$$S_2 = 2\,l \cdot \left| 1 - \frac{\cos(\theta \pm \phi_1)}{\cos\theta \pm \phi_1 \sin\theta} \right| \cdot \left( \frac{Na_1}{Na_2} \right) \cdot \tan\{\sin^{-1}(Na_1)\}$$

wherein $\theta$ is an incident angle of the principal light beam emitted from the laser beam source to the first surface of the optical beam separating means, $l$ is a length from the laser beam source to the first surface, $Na_1$ is the numerical aperture of the condensor lens on the laser beam side, $Na_2$ is the numerical aperture of the lens on the data storing side and $\phi_1$ is the first diffraction angle of the principal light beam emitted from the laser beam source.

7. The optical type head device according to claim 4, wherein said intensity ratio is 0.01 or lower.

8. The optical type head device according to claim 1, wherein the fringes of said diffraction grating constitute an interference fringe pattern in said first surface of said optical beam separating means, which is caused by a light beam having the substantially same wavelength as the principal light beam emitted from said light source, said light beam being emitted from a point light source which is arranged in a plane which includes said light source and is perpendicular to the optical axis of said light beam from said light source.

9. The optical type head device according to claim 8, wherein the subbeams separated by said optical beam separating means are converged on said data storing medium as three light spots which exist in a generally meridional plane with respect to the first surface of said optical beam separating means.

10. The optical type head device according to claim 8, wherein said subbeams separated by said optical beam separating means are coverged on said data storing medium as three light spots which exist in a generally sagittal plane with respect to the first surface of said optical beam separating means.

11. The optical type head device according to claim 8, wherein said subbeam separated by said optical beam separating means are converged on said data storing medium as three light spots which exist in a plane formed at an angle of about 45° from a meridional plane with respect to the first surface of said optical beam separating means.

12. The optical type head device according to claim 1, wherein said diffraction grating has a rectangular recess in cross-section having a duty ratio of 0.5 so that an incident light is diffracted by a phase difference given by a recessed portion having the rectangular cross-section.

13. The optical type head device according to claim 1, wherein said diffraction grating is formed by a silicon dioxide material.

14. The optical type head device according to claim 1, wherein said diffraction grating is formed by a polymethyl methacrylate material.

15. The optical type head device according to claim 1, wherein astigmatism is given by passing said subbeams reflected by said data storing medium through the first and second surfaces of said optical beam separating means, whereby deformation of the light spot, which indicates out of focus, of said zero-order subbeam is detected.

16. The optical type head device according to claim 1, wherein the first and second surface of said optical beam separating means are in parallel with each other.

17. The optical type head device according to claim 1, wherein the first and second surfaces of said optical beam separating means constitute wedged surfaces.

18. The optical type head device according to claim 1, wherein a light sensing area for receiving said zero-order subbeam of said light detector is divided into four sections, and the meridional focal line and the sagittal focal line of the zero-order subbeam subjected to the astigmatism are respectively received in the diagonal areas of the four sections of said light detector.

19. The optical type head device according to claim 1, wherein said light detector is positioned to receive the circle of least confusion of a reflected light beam corresponding to the zero-order subbeam subjected to the astigmatism when the zero-order subbeam is focused on said optical type data storing medium.

* * * * *

UNITED STATES PATENT AND TRADEMARK OFFICE
CERTIFICATE OF CORRECTION

PATENT NO. : 4,753,513             Page 1 of 14

DATED : June 28, 1988

INVENTOR(S) : SHINSUKE SHIKAMA

It is certified that error appears in the above-identified patent and that said Letters Patent is hereby corrected as shown below:

In Figures 12 and 13, the legend "15mm" should be change to --1.5mm--.

Column 1, line 19, delete "condensor" and insert therefor --condenser--;

Column 1, line 47, delete "direction" and insert therefor --position--.

Column 2, line 7, delete "astimatic" and insert therefor --astigmatic--;

Column 2, line 14, delete "10b, 10c" and insert therefor --10a, 10b, 10c, 10d--;

Column 2, line 36, delete "condensor" and insert therefor --condenser--;

Column 2, line 42, delete "condensor" and insert therefor --condenser--;

Column 3, line 13, after "an" insert --incident--;

Column 3, line 25, delete "typical" and insert therefor --conventional--;

Column 3, line 25, after "head" insert --device--;

Column 3, line 32, delete "change in" and insert therefor --change of--;

Column 3, line 33, after "grating" insert --shown--;

UNITED STATES PATENT AND TRADEMARK OFFICE
CERTIFICATE OF CORRECTION

PATENT NO. : 4,753,513

DATED : June 28, 1988

INVENTOR(S) : SHINSUKE SHIKAMA

It is certified that error appears in the above-identified patent and that said Letters Patent is hereby corrected as shown below:

Column 3, line 43, delete "astimatic" and insert therefor --astigmatic--;

Column 3, line 44, delete "diffracting" and insert therefor --diffraction--;

Column 3, line 58, delete "reflecting factor" and insert therefor --reflectivity--;

Column 3, line 60, after "when" delete "the";

Column 3, line 61, delete "reflecting factor is not so severly required." and insert therefor --high reflectivity is not required--;

Column 3, line 63, after "AR" insert --(antireflection)--.

Column 4, line 5, delete "condensor" and insert therefor --condenser--;

Column 4, line 18, delete "having the" and insert therefor --has--;

Column 4, line 20, after "having" delete "a";

Column 4, line 47, delete "one-dotted" and insert therefor --one dotted--;

UNITED STATES PATENT AND TRADEMARK OFFICE
CERTIFICATE OF CORRECTION

PATENT NO. : 4,753,513
DATED : June 28, 1988
INVENTOR(S) : SHINSUKE SHIKAMA

It is certified that error appears in the above-identified patent and that said Letters Patent is hereby corrected as shown below:

Column 4, line 49, delete "and negative subbeams" and insert therefor --first-order subbeam--;

Column 4, line 60, delete "co-ordinates" and insert therefor --coordinates--.

Column 5, line 7, delete "grooves" and insert therefor --groove locus--;

Column 5, line 9, after "subbeam" insert --, which was generated by the reflective diffraction of the principal beam emitted from the point M,--;

Column 5, line 9, delete "emitted from the light source 1 at the";

Column 5, line 10, delete "point M and reflected by the grating surface 30";

Column 5, line 15, delete "is" and insert therefor --are--;

Column 5, line 19, delete "co-ordinate" and insert therefor --coordinate--;

Column 5, line 33, delete "determining" and insert therefor --determined--;

UNITED STATES PATENT AND TRADEMARK OFFICE
CERTIFICATE OF CORRECTION

PATENT NO. : 4,753,513

DATED : June 28, 1988

INVENTOR(S) : SHINSUKE SHIKAMA

It is certified that error appears in the above-identified patent and that said Letters Patent is hereby corrected as shown below:

Column 5, line 40, delete "co-ordinate" and insert therefor --coordinate--;

Column 5, line 46, delete "the locus of the each" and insert therefor --the locus of each--;

Column 5, line 62, after "is" delete "in".

Column 6, line 20, delete "astigmatism" and insert therefor --astigmatic--;

Column 6, line 20, after "directed" delete "to";

Column 6, line 34, delete "occuring" and insert therefor --occurring--;

Column 6, line 35, delete "9b" and insert therefor --9e--;

Column 6, line 41, after "9f" insert --can be converged to be the diffraction limited shape.--;

Column 6, line 41, delete "provide a";

Column 6, line 42, delete "shape having desired diffraction limit.";

Column 6, line 60, after "transmitting" insert --positive and negative first-order diffracted--;

UNITED STATES PATENT AND TRADEMARK OFFICE
CERTIFICATE OF CORRECTION

PATENT NO. : 4,753,513

DATED : June 28, 1988

INVENTOR(S) : SHINSUKE SHIKAMA

It is certified that error appears in the above-identified patent and that said Letters Patent is hereby corrected as shown below:

Column 6, line 61, after "transmitting" insert --diffracted--;

Column 6, line 63, delete "into" and insert therefor --on--.

Column 7, line 15, delete "e, f." and insert therefor --f, e.--;

Column 7, line 17, delete "4" and insert therefor --40--;

Column 7, line 19, after "and" insert --are transmitted by--;

Column 7, line 33, delete "signal" and insert therefor --light--;

Column 7, line 40, delete "reduces" and insert therefor --reduce--.

Column 8, line 13, after "phase" insert --difference--;

Column 8, line 18, delete "(1)" and insert therefor --(3)--;

Column 8, line 22, after "phase" insert

UNITED STATES PATENT AND TRADEMARK OFFICE
CERTIFICATE OF CORRECTION

PATENT NO. : 4,753,513

DATED : June 28, 1988

INVENTOR(S) : SHINSUKE SHIKAMA

Page 6 of 14

It is certified that error appears in the above-identified patent and that said Letters Patent is hereby corrected as shown below:

--difference--;

Column 8, line 26, after "same" delete "the";

Column 8, line 30, delete in its entirety and insert therefor $--\phi_T = 2\pi d \left( \cos(\theta) - \sqrt{n_g^2 - \sin^2(\theta)} \right) / \lambda \quad (4)--$;

Column 8, line 38, after "first-order" insert --diffracted--;

Column 8, line 39, after "zero-order" insert --diffracted--;

Column 8, line 40, after "phase" insert --difference--;

Column 8, line 45, delete "(3)" and insert therefor --(5)--;

Column 8, line 48, delete "(3)" and insert therefor --(5)--;

Column 8, line 49, after "first-order" insert --diffracted--;

Column 8, line 53, delete "detector 10" and insert therefor --detectors 10a, 10b, 10c, 10d--;

Column 8, line 56, delete "(4)" and insert therefor

UNITED STATES PATENT AND TRADEMARK OFFICE
CERTIFICATE OF CORRECTION

PATENT NO. : 4,753,513
DATED : June 28, 1988
INVENTOR(S) : SHINSUKE SHIKAMA

It is certified that error appears in the above-identified patent and that said Letters Patent is hereby corrected as shown below:

--(6)--;

Column 8, line 57 delete "(1), (2)" and insert therefor --(3), (4)--;

Column 8, line 58, delete "(3)" and insert therefor --(5)--;

Column 8, line 60, delete "(4)" and insert therefor --(6)--;

Column 8, line 66, delete "(1), (2)" and insert therefor --(3), (4)--;

Column 8, lines 67, delete "(4)" and insert therefor --(6)--.

Column 9, line 5, delete "(4)" and insert therefor --(6)--;

Column 9, line 7, delete "evident" and insert therefor --readable--;

Column 9, line 19, delete "(4)" and insert therefor --(6)--;

Column 9, line 31, delete "30a" and insert therefor --32--;

UNITED STATES PATENT AND TRADEMARK OFFICE
CERTIFICATE OF CORRECTION

PATENT NO. : 4,753,513

DATED : June 28, 1988

INVENTOR(S) : SHINSUKE SHIKAMA

Page 8 of 14

It is certified that error appears in the above-identified patent and that said Letters Patent is hereby corrected as shown below:

Column 9, line 36, after "first-order" insert --diffracted--;

Column 9, line 38, delete "required" and insert therefor --derived--;

Column 9, line 40, after "first-order" insert --diffracted--;

Column 9, line 43, after "the" insert --influence of the--;

Column 9, line 44, after "first-order" insert --diffracted--;

Column 9, line 45, delete "cancel-" and insert therefor --subtracting--;

Column 9, line 46, delete "ling";

Column 9, line 56, delete "(1), (2) and (4)." and insert therefor --(3), (4) and (6).--;

Column 9, line 59, delete "(4)" and insert therefor --(6)--;

Column 9, line 60, after "embodiment" insert --of the--;

UNITED STATES PATENT AND TRADEMARK OFFICE
CERTIFICATE OF CORRECTION

PATENT NO. : 4,753,513
DATED : June 28, 1988
INVENTOR(S) : SHINSUKE SHIKAMA It is certified that error appears in the above-identified patent and that said Letters Patent is hereby corrected as shown below:

Column 9, line 64, delete "distance" and insert therefor --period--;

Column 9, line 67, delete "(1)-(4)." and insert therefor --(3)-(6).--;

Column 9, line 68, delete "(1)-(4)" and insert therefor --(3)-(6)--.

Column 10, line 2, delete "distance" and insert therefor --period--;

Column 10, line 11, delete "device" and insert therefor --material--;

Column 10, line 65, delete "an emitting" and insert therefor --a diverging--.

Column 11, line 18, delete "distance of the track 8" and insert therefor --track pitch--;

Column 11, line 23, delete "17" and insert therefor --16--;

Column 11, line 26, delete "17" and insert therefor --16--;

Column 11, line 29, delete "between" and insert

UNITED STATES PATENT AND TRADEMARK OFFICE
CERTIFICATE OF CORRECTION

PATENT NO. : 4,753,513

DATED : June 28, 1988

INVENTOR(S) : SHINSUKE SHIKAMA

It is certified that error appears in the above-identified patent and that said Letters Patent is hereby corrected as shown below:

therefor --of--;

Column 11, line 35, after "case of" insert --transmission--;

Column 11, line 36, delete "of transmitting subbeams";

Column 11, line 37, after "case of" insert --reflective--;

Column 11, line 37, delete "of re-";

Column 11, line 38, delete "flecting the subbeams";

Column 11, line 53, delete "FIG." and insert therefor --FIGS.--;

Column 11, line 64, delete "data-bearing" and insert therefor --data-containing--.

Column 12, line 15, delete "smallest" and insert therefor --longest--;

Column 12, line 37, delete "focal distance" and insert therefor --difference--;

Column 12, line 44, after "the" insert --chief ray of the--;

UNITED STATES PATENT AND TRADEMARK OFFICE
CERTIFICATE OF CORRECTION

PATENT NO. : 4,753,513

DATED : June 28, 1988

INVENTOR(S) : SHINSUKE SHIKAMA

It is certified that error appears in the above-identified patent and that said Letters Patent is hereby corrected as shown below:

Column 12, line 48, delete "(5)" and insert therefor --(7)--;

Column 12, line 50, delete "(5)" and insert therefor --(7)--;

Column 12, line 61, delete "$\Delta_1$" and insert therefor --$\ell$--;

Column 12, line 64, delete "(6)" and insert therefor --(8)--.

Column 13, line 1, delete "(6)" and insert therefor --(8)--;

Column 13, line 9, delete "(8)" and insert therefor --(9)--;

Column 13, line 17, delete "(6) and (8)" and insert therefor --(8) and (9)--;

Column 13, line 20, delete "(9)" and insert therefor --(10)--;

Column 13, line 30, delete "(10)" and insert therefor --(11)--;

Column 13, line 32, delete "(5), (9)" and insert

UNITED STATES PATENT AND TRADEMARK OFFICE
CERTIFICATE OF CORRECTION

PATENT NO. : 4,753,513
DATED : June 28, 1988
INVENTOR(S) : SHINSUKE SHIKAMA

It is certified that error appears in the above-identified patent and that said Letters Patent is hereby corrected as shown below:

therefor --(7), (10)--;

Column 13, line 34, delete "(10)" and insert therefor --(11)--;

Column 13, line 39, delete "(5)" and insert therefor --(7)--;

Column 13, line 42, delete "(9)" and insert therefor --(10)--;

Column 13, line 43, delete "(10)" and insert therefor --(11)--;

Column 13, line 68, delete "(9)" and insert therefor --(10)--.

Column 14, line 6, after "discs" insert --, although the example cited above is applied to compact discs--;

Column 14, line 23, after "tracking" insert --error--;

Column 14, lines 45-46, delete "a light detector for receiving for photoelectric conversion said subbeams" and insert therefor --a light detector to effect a photoelectric conversion by receiving subbeams--;

UNITED STATES PATENT AND TRADEMARK OFFICE
CERTIFICATE OF CORRECTION

PATENT NO. : 4,753,513

DATED : June 28, 1988

INVENTOR(S) : SHINSUKE SHIKAMA

It is certified that error appears in the above-identified patent and that said Letters Patent is hereby corrected as shown below:

Column 14, line 61, delete "said splitter" and insert therefor --said beam splitter--.

Column 15, line 8, delete "subbeams." and insert therefor --subbeam.--.

Column 15, line 54, delete "$Na_1$" and insert therefor --Na1--;

Column 15, line 54, delete "condensor" and insert therefor --condenser--;

Column 15, line 55, delete "$Na_2$" and insert therefor --Na2--;

Column 15, line 56, delete "side and" and insert therefor --side,--;

Column 15, line 56, delete "first" and insert therefor --first-order--;

Column 15, line 64, delete "a" and insert therefor --two--.

Column 16, line 1, delete "beam" and insert therefor --beams--;

Column 16, line 3, after "said" insert --two--;

UNITED STATES PATENT AND TRADEMARK OFFICE
CERTIFICATE OF CORRECTION

PATENT NO. : 4,753,513

DATED : June 28, 1988

INVENTOR(S) : SHINSUKE SHIKAMA

It is certified that error appears in the above-identified patent and that said Letters Patent is hereby corrected as shown below:

```
    Column 16, line 3, delete "beam" and insert therefor
--beams--;
    Column 16, line 3, delete "a" and insert therefor
--two--;
    Column 16, line 3, delete "source" and insert
therefor --sources--;
    Column 16, line 4, delete "is" and insert therefor
--are--;
    Column 16, line 15, delete "coverged" and insert
therefor --converged--;
    Column 16, line 46, delete "surface" and insert
therefor --surfaces--.
```

Signed and Sealed this

Twenty-first Day of June, 1994

BRUCE LEHMAN

*Attest:*

*Attesting Officer*     *Commissioner of Patents and Trademarks*